(12) United States Patent
Lin et al.

(10) Patent No.: US 12,487,891 B2
(45) Date of Patent: Dec. 2, 2025

(54) METHOD FOR BACKING UP CONFIGURATION FILE

(71) Applicant: Mitac Computing Technology Corporation, Taoyuan (TW)

(72) Inventors: Hung-Ta Lin, Taoyuan (TW); Sheng-Min Chen, Taoyuan (TW); Po-Wei Yang, Taoyuan (TW); Ying-Jie Liu, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 0 days.

(21) Appl. No.: 18/644,651

(22) Filed: Apr. 24, 2024

(65) Prior Publication Data

US 2025/0077357 A1 Mar. 6, 2025

(30) Foreign Application Priority Data

Sep. 6, 2023 (TW) ................................ 112133899

(51) Int. Cl.
*G06F 16/00* (2019.01)
*G06F 11/14* (2006.01)
*G06F 16/27* (2019.01)

(52) U.S. Cl.
CPC ...... *G06F 11/1458* (2013.01); *G06F 11/1402* (2013.01); *G06F 16/27* (2019.01); *G06F 2201/84* (2013.01)

(58) Field of Classification Search
CPC ............ G06F 11/1458; G06F 2201/84; G06F 11/1402; G06F 16/27

USPC .......................................................... 707/640
See application file for complete search history.

(56) References Cited

U.S. PATENT DOCUMENTS

| | | | |
|---|---|---|---|
| 9,575,850 B2 * | 2/2017 | Lecourtier | G06F 11/1687 |
| 2023/0129037 A1 * | 4/2023 | Wang | G06F 11/0772 |
| | | | 713/2 |

FOREIGN PATENT DOCUMENTS

| | | | | |
|---|---|---|---|---|
| CN | 110162429 A | * | 8/2019 | ......... G06F 11/1469 |
| JP | 2014174865 A | * | 9/2014 | |

OTHER PUBLICATIONS

Michael Opdenacker; "Managing flash storage with Linux", https://bootlin.com/blog/managing-flash-storage-with-linux/, p. 1-20, Dec. 2, 2012.*

* cited by examiner

*Primary Examiner* — Monica M Pyo
(74) *Attorney, Agent, or Firm* — MLO, a professional corp.

(57) ABSTRACT

A method for backing up a configuration file of a computer device is implemented by a baseboard management controller, and includes steps of: mounting a first partition, a second partition and a third partition of a flash memory storage device of the computer device; storing a copy of the configuration file in at least one of the first partition, the second partition and the third partition that has been mounted successfully as a backup; running an operating system stored in the flash memory storage device; and neither reading nor writing to the third partition while running the OS.

6 Claims, 4 Drawing Sheets

METHOD FOR BACKING UP CONFIGURATION FILE

CROSS-REFERENCE TO RELATED APPLICATION

This application claims priority to Taiwanese Invention Patent Application No. 112133899, filed on Sep. 6, 2023, and incorporated by reference herein in its entirety.

FIELD

The disclosure relates to a method for backing up a configuration file of a computer device.

BACKGROUND

When a board management controller (BMC) performs initialization based on a code base, a journaling flash file system version 2 (JFFS2) filesystem is mounted on a partition of a flash memory storage device, wherein the partition stores a plurality of system configuration files. After initialization, the BMC may read and write the system configuration files based on demands at any time. When power failure occurs as the BMC is writing the system configuration files, the system configuration files may be damaged. As a result, next time when the BMC is powered on and performs initialization, the JFFS2 filesystem may be unable to be mounted on the partition of the flash memory storage device due to damages of the system configuration files.

Two conventional solutions are currently available to solve the abovementioned issue.

One of the conventional solutions is to use a utility software "rsync" to synchronize two partitions of a flash memory storage device, wherein one of the partitions serves as a primary partition, and the other of the partitions serves as a backup partition. Whenever the system configuration files stored in the primary partition are modified, the BMC running the utility software "rsync" would overwrite the system configuration files stored in the backup partition with copies of the system configuration files stored in the primary partition. When the JFFS2 filesystem fails to be mounted during the initialization performed by the BMC based on the system configuration files stored in the primary partition, the JFFS2 filesystem would alternatively be mounted based on the system configuration files stored in the backup partition. In this way, operating system could run normally after the initialization. However, for this solution, the flash memory storage device would be frequently written for backup and would thereby be prone to damage.

The other of the conventional solutions is to adopt a dual-image approach. That is to say, two image files each containing a complete set of the system configuration files are stored in a flash memory storage device (or respectively in two flash memory storage devices) for the BMC to perform initialization. When the BMC fails to perform initialization based on one of the image files, the BMC would alternatively perform initialization based on the other of the image files. However, for this solution, two times the storage capacity or two flash memory storage devices are required, and thus hardware cost is increased.

SUMMARY

Therefore, an object of the disclosure is to provide a method for backing up a configuration file of a computer device that can alleviate at least one of the drawbacks of the prior art.

According to the disclosure, the computer device includes a flash memory storage device, and a baseboard management controller that is electrically connected to the flash memory storage device. The flash memory storage device includes a first partition that stores a first version of the configuration file, a second partition that stores a second version of the configuration file, and a third partition that stores a third version of the configuration file. The flash memory storage device stores an operating system (OS). The method is implemented by the baseboard management controller and includes steps of:

mounting the first partition, and determining whether the first partition has been mounted successfully;

when it is determined that the first partition has been mounted successfully, mounting the second partition and determining whether the second partition has been mounted successfully;

when it is determined that the first partition and the second partition have both been mounted successfully, mounting the third partition and determining whether the third partition has been mounted successfully;

when it is determined that the first partition, the second partition and the third partition have all been mounted successfully, overwriting the configuration file stored in the third partition with a copy of the first version of the configuration file stored in the first partition and running the OS;

when it is determined that only the first partition and the second partition have been mounted successfully while the third partition has not been mounted successfully, repairing the third partition, overwriting the configuration file stored in the third partition with a copy of the first version of the configuration file stored in the first partition and running the OS;

when it is determined that the first partition has not been mounted successfully, mounting the second partition and determining whether the second partition has been mounted successfully;

when it is determined that neither the first partition nor the second partition has been mounted successfully, repairing the first partition and the second partition, mounting the third partition, and determining whether the third partition has been mounted successfully;

when it is determined that neither the first partition nor the second partition has been mounted successfully while the third partition has been mounted successfully, overwriting the configuration file stored in each of the first partition and the second partition with a copy of the third version of the configuration file stored in the third partition and running the OS; and neither reading nor writing to the third partition while running the OS.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
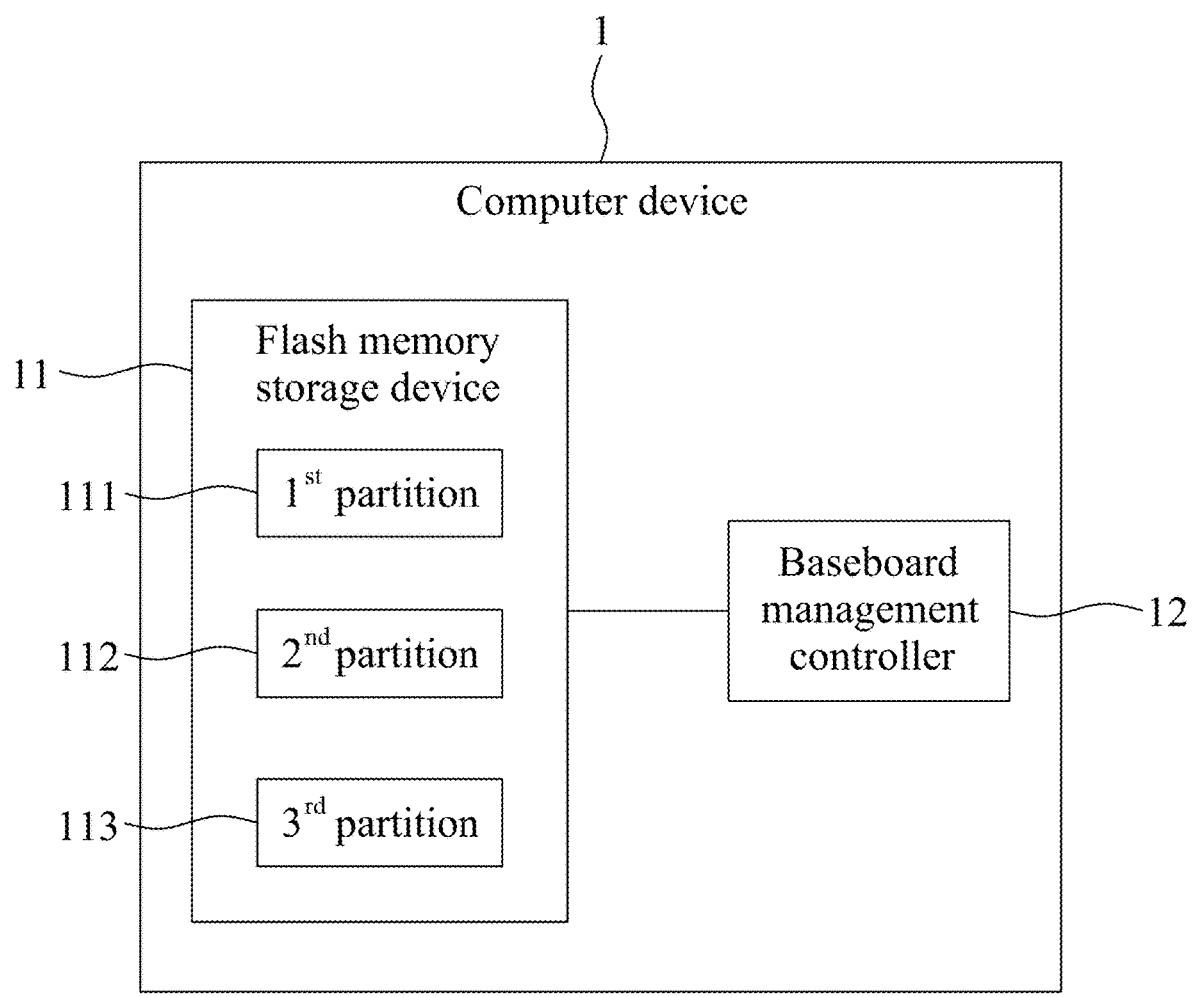
FIG. 1 is a block diagram illustrating a computer device according to an embodiment of the disclosure.

Referring to FIG. 1, an embodiment of a computer device 1 according to the disclosure is illustrated. The computer device 1 may be a server or an embedded system, but is not limited thereto. The computer device 1 includes a flash memory storage device 11 and a baseboard management controller 12. The baseboard management controller 12 is electrically connected to the flash memory storage device 11. The flash memory storage device 11 includes a first partition 111 that stores a first version of a plurality of configuration files (e.g., settings related to network, securities, hardware control or the like), a second partition 112 that stores a second version of the configuration files, and a third partition 113 that stores a third version of the configuration files. The flash memory storage device 11 stores an operating system (OS). The OS is exemplarily Linux, but is not limited thereto.

Figure 2:
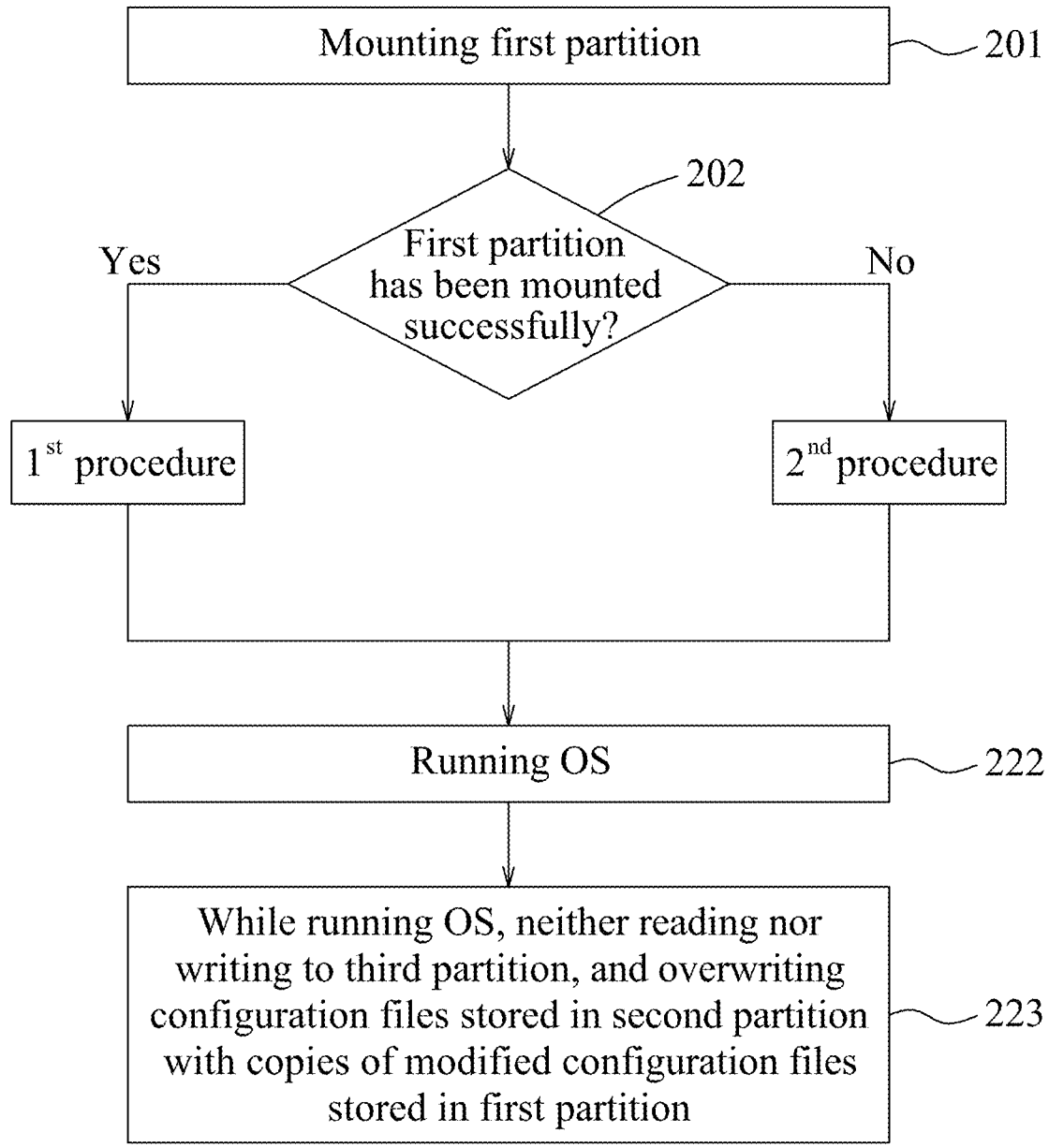
FIGS. 2 to 4 are flow charts cooperatively illustrating a method for backing up a configuration file of the computer device according to an embodiment of the disclosure.
Figure 3:
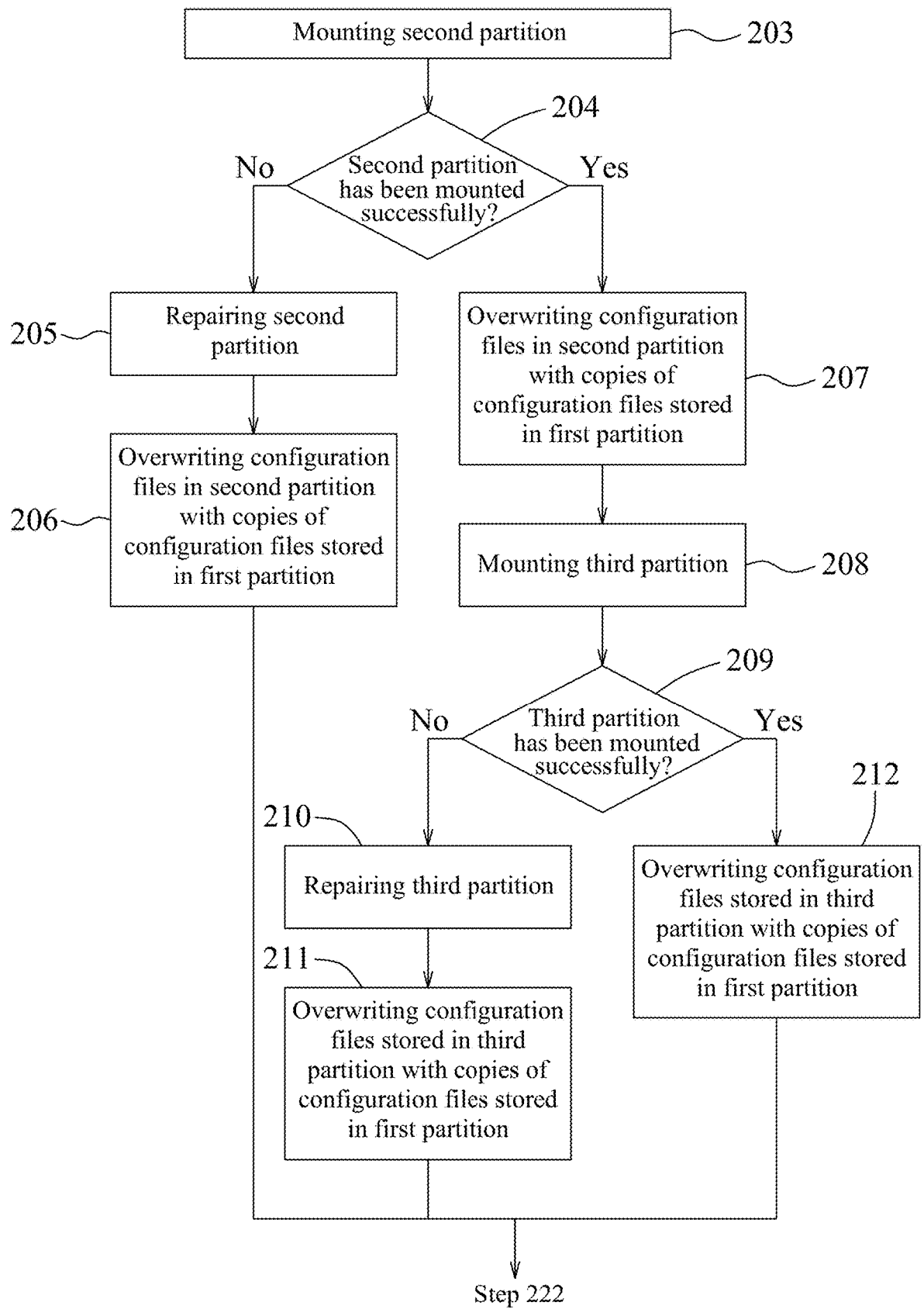
Figure 4:
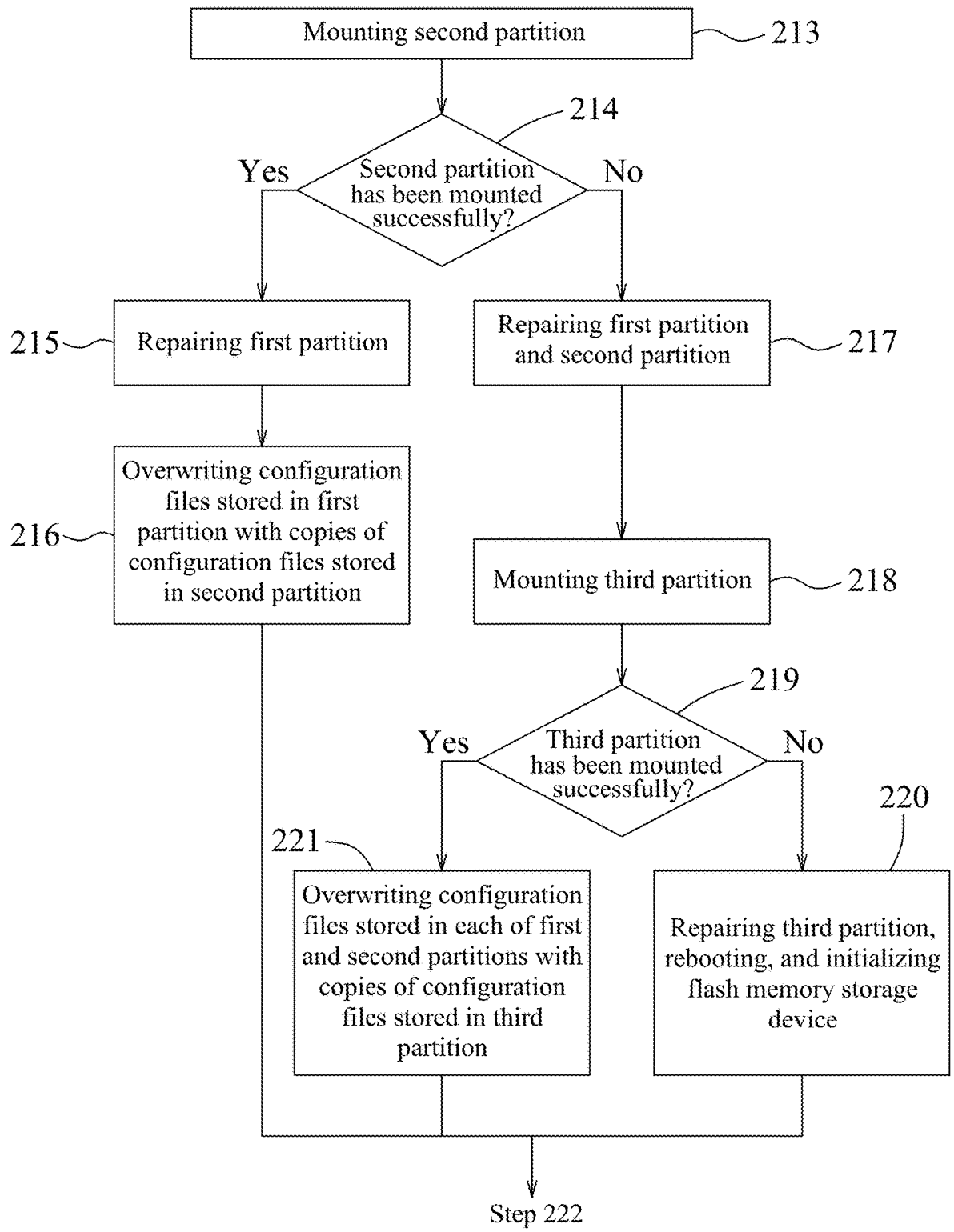

Referring to FIGS. 2 to 4, an embodiment of a method for backing up the configuration files of the computer device 1 is illustrated. The method is implemented by the baseboard management controller 12 of the computer device 1. The method includes steps 201 to 223 delineated below.

In step 201, the baseboard management controller 12 mounts the first partition 111.

In step 202, the baseboard management controller 12 determines whether the first partition 111 has been mounted successfully. When it is determined that the first partition 111 has been mounted successfully, a first procedure is executed. On the other hand, when it is determined that the first partition 111 has not been mounted successfully, a second procedure is executed.

It is worth to note that in this embodiment, determination as to whether or not the first partition 111 has been mounted successfully is implemented by using a technique of cyclic redundancy check (CRC). In brief, an incomplete write operation performed on a file stored in a partition of a flash memory storage device would result in a CRC error, which prevents the partition of the flash memory storage device from being mounted on a filesystem. Since the technique of CRC is well known to one skilled in the relevant art, detailed explanation of the same is omitted herein for the sake of brevity.

Referring to FIG. 3, the first procedure is illustrated and includes steps 203 to 212 delineated below.

In step 203, the baseboard management controller 12 mounts the second partition 112.

In step 204, the baseboard management controller 12 determines whether the second partition 112 has been mounted successfully. When it is determined that the second partition 112 has not been mounted successfully, a procedure flow of the method proceeds to step 205. Otherwise, when it is determined that the second partition 112 has been mounted successfully, the procedure flow proceeds to step 207.

In step 205, the baseboard management controller 12 repairs the second partition 112. In this embodiment, the baseboard management controller 12 repairs the second partition 112 by erasing the configuration files stored in the second partition 112 and formatting the second partition 112, but is not limited thereto.

In step 206, the baseboard management controller 12 overwrites the configuration files stored in the second partition 112 with a copy of the first version of the configuration files stored in the first partition 111, and then the procedure flow proceeds to step 222.

In step 207, the baseboard management controller 12 overwrites the configuration files stored in the second partition 112 with a copy of the first version of the configuration files stored in the first partition 111.

In step 208, the baseboard management controller 12 mounts the third partition 113.

In step 209, the baseboard management controller 12 determines whether the third partition 113 has been mounted successfully. When it is determined that the third partition 113 has not been mounted successfully, the procedure flow proceeds to step 210. On the other hand, when it is determined that the third partition 113 has been mounted successfully, the procedure flow proceeds to step 212.

In step 210, the baseboard management controller 12 repairs the third partition 113.

In step 211, the baseboard management controller 12 overwrites the configuration files stored in the third partition 113 with a copy of the first version of the configuration files stored in the first partition 111, and then the procedure flow proceeds to step 222.

In step 212, the baseboard management controller 12 overwrites the configuration files stored in the third partition 113 with a copy of the first version of the configuration files stored in the first partition 111, and then the procedure flow proceeds to step 222.

It should be noted that the baseboard management controller 12 overwrites the configuration files stored in the third partition 113 with a copy of the first version of the configuration files stored in the first partition 111 only when the first partition 111 and the second partition 112 have both been mounted successfully, and such a condition means that the configuration files stored in the first partition 111 are most likely complete and uncorrupted. Comparatively, when the first partition 111 has been mounted successfully but the second partition 112 has not been mounted successfully, it means that some errors may have existed in the configuration files stored in the first partition 111, and such errors were carried from the configuration files stored in the first partition 111 to the configuration files stored in the second partition 112 when overwriting the configuration files stored in the second partition 112 with a copy of the first version of the configuration files stored in the first partition 111 and cause failure to mount the second partition 112.

Referring to FIG. 4, the second procedure is illustrated and includes steps 213 to 221 delineated below.

In step 213, the baseboard management controller 12 mounts the second partition 112.

In step 214, the baseboard management controller 12 determines whether the second partition 112 has been mounted successfully. When it is determined that the second partition 112 has been mounted successfully, the procedure flow proceeds to step 215. On the other hand, when it is determined that the second partition 112 has not been mounted successfully, the procedure flow proceeds to step 217.

In step 215, the baseboard management controller 12 repairs the first partition 111.

In step 216, the baseboard management controller 12 overwrites the configuration files stored in the first partition 111 with a copy of the second version of the configuration files stored in the second partition 112.

In step 217, the baseboard management controller 12 repairs the first partition 111 and the second partition 112.

In step 218, the baseboard management controller 12 mounts the third partition 113.

In step 219, the baseboard management controller 12 determines whether the third partition 113 has been mounted successfully. When it is determined that the third partition 113 has not been mounted successfully, the procedure flow proceeds to step 220. Contrarily, when it is determined that the third partition 113 has been mounted successfully, the procedure flow proceeds to step 221.

In step 220, the baseboard management controller 12 repairs the third partition 113, reboots itself (i.e., the baseboard management controller 12), and initializes the flash memory storage device 11 after the baseboard management controller 12 has been rebooted. In this embodiment, the baseboard management controller 12 initializes the flash memory storage device 11 by restoring factory settings of the flash memory storage device 11, but is not limited thereto. Then, the method is executed again from the start.

In step 221, the baseboard management controller 12 overwrites the configuration files stored in each of the first partition 111 and the second partition 112 with a copy of the third version of the configuration files stored in the third partition 113, and then the procedure flow proceeds to step 222.

In step 222, the baseboard management controller 12 runs the OS.

In step 223, the baseboard management controller 12 neither reads nor writes to the third partition 113 while running the OS. Moreover, while running the OS, the baseboard management controller 12 overwrites the configuration files stored in the second partition 112 with a copy of the first version of the configuration files stored in the first partition 111 when the first version of the configuration files stored in the first partition 111 has been modified.

To sum up, for the method according to the disclosure, during a booting process, when it is determined that the first partition 111, the second partition 112 and the third partition 113 have all been mounted successfully, the baseboard management controller 12 overwrites the configuration files stored in the third partition 113 with a copy of the first version of the configuration files stored in the first partition 111 so as to ensure that the configuration files stored in the third partition 113 are complete and uncorrupted. Moreover, when it is determined that the first partition 111 and the second partition 112 have neither been mounted successfully, the baseboard management controller 12 overwrites the configuration files stored in each of the first partition 111 and the second partition 112 with a copy of the third version of the configuration files stored in the third partition 113. In this way, a trouble that the configuration files stored in each of the first partition 111 and the second partition 112 are corrupted at the same time may be alleviated, without additional hardware cost. It is worth to note that the baseboard management controller 12 neither reads nor writes to the third partition 113 while running the OS, so deterioration of the third partition 113 may be mitigated. Last but not least, the baseboard management controller 12 overwrites the configuration files stored in the second partition 112 with a copy of the first version of the configuration files stored in the first partition 111 when the first version of the configuration files stored in the first partition 111 has been modified, thereby ensuring that the configuration files stored in the second partition 112 are the latest version.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for backing up a configuration file of a computer device, the computer device including a flash memory storage device and a baseboard management controller electrically connected to the flash memory storage device, the method being implemented by the baseboard management controller and comprising:

partitioning the flash memory storage device into a first partition that stores a first version of the configuration file, a second partition that stores a second version of the configuration file, and a third partition that stores a third version of the configuration file, the flash memory storage device storing an operating system (OS);

mounting the first partition, and determining whether the first partition has been mounted successfully;

mounting the second partition and determining whether the second partition has been mounted successfully, by the baseboard management controller, based on determining that the first partition has been mounted successfully;

mounting the third partition and determining whether the third partition has been mounted successfully, by the baseboard management controller, based on determining that the first partition and the second partition have both been mounted successfully;

making a copy of the first version of the configuration file stored in the first partition, overwriting the configuration file stored in the third partition with the copy of the first version of the configuration file, and then running the OS, by the baseboard management controller, based on determining that the first partition, the second partition and the third partition have all been mounted successfully;

repairing the third partition, making the copy of the first version of the configuration file stored in the first partition, overwriting the configuration file stored in the third partition with the copy of the first version of the configuration file, and then running the OS, by the baseboard management controller, based on determining that only the first partition and the second partition have been mounted successfully while the third partition has not been mounted successfully;

mounting the second partition and determining whether the second partition has been mounted successfully, by the baseboard management controller, based on determining that the first partition has not been mounted successfully;

repairing the first partition and the second partition, mounting the third partition, and determining whether the third partition has been mounted successfully, by the baseboard management controller, based on determining that neither the first partition nor the second partition has been mounted successfully;

making a copy of the third version of the configuration file stored in the third partition, overwriting the configuration file stored in each of the first partition and the second partition with the copy of the third version of the configuration file, and then running the OS, by the baseboard management controller, based on determining that the first partition and the second partition have neither been mounted successfully while the third partition has been mounted successfully;

neither reading nor writing to the third partition while running the OS; and while running the OS, when the first version of the configuration file stored in the first partition has been modified, making the copy of the first version of the configuration file stored in the first partition, and overwriting the configuration file stored in the second partition with the copy of the first version of the configuration file.

2. The method as claimed in claim 1, further comprising:
repairing the third partition, rebooting the baseboard management controller, and initializing the flash memory storage device after the baseboard management controller has been rebooted, by the baseboard management controller, based on determining that none of the first partition, the second partition and the third partition has been mounted successfully.

3. The method as claimed in claim 1, further comprising:
repairing the second partition, making the copy of the first version of the configuration file stored in the first partition, overwriting the configuration file stored in the second partition with the copy of the first version of the configuration file, and then running the OS, by the baseboard management controller, based on determining that the first partition has been mounted successfully and the second partition has not been mounted successfully.

4. The method as claimed in claim 1, further comprising:
repairing the first partition, making a copy of the second version of the configuration file stored in the second partition, overwriting the configuration file stored in the first partition with the copy of the second version of the configuration file, and then running the OS, by the baseboard management controller, based on determining that the first partition has not been mounted successfully and the second partition has been mounted successfully.

5. The method as claimed in claim 1, further comprising:
making the copy of the first version of the configuration file stored in the first partition, and overwriting the configuration file stored in the second partition with the copy of the first version of the configuration file, by the baseboard management controller, based on determining that the first partition and the second partition have both been mounted successfully.

6. The method as claimed in claim 1, wherein:
repairing the third partition is to erase the configuration file stored in the third partition and to format the third partition; and
repairing the first partition and the second partition is to erase the configuration file stored in each of the first partition and the second partition and to format the first partition and the second partition.

* * * * *